United States Patent [19]

McNiven et al.

[11] Patent Number: 5,617,260
[45] Date of Patent: Apr. 1, 1997

[54] OPTICAL INSTRUMENT WITH ROTATABLE LENS TURRET

[75] Inventors: J. Peter McNiven, Don Mills, Canada; Daniel Vukobratovich, Tucson, Ariz.

[73] Assignee: Wescam Inc., Hamilton, Canada

[21] Appl. No.: 415,870

[22] Filed: Apr. 3, 1995

[51] Int. Cl.⁶ .............................. G02B 7/02; G02B 21/00
[52] U.S. Cl. ........................................ 359/821; 359/381
[58] Field of Search ..................................... 359/821, 381, 359/421, 672, 813

[56] References Cited

U.S. PATENT DOCUMENTS

| | | | |
|---|---|---|---|
| 2,800,038 | 7/1957 | Jonson | 359/821 |
| 3,873,182 | 5/1975 | Furuhashi | 359/381 |
| 4,363,532 | 12/1982 | Weber | 359/381 |
| 4,486,078 | 12/1984 | Hashimoto | 359/821 |
| 4,866,477 | 9/1989 | Barry | 35/55 |

FOREIGN PATENT DOCUMENTS

| | | | |
|---|---|---|---|
| 1282041 | 1/1987 | U.S.S.R. | 359/821 |
| 1422211 | 9/1988 | U.S.S.R. | 359/821 |
| 1536341 | 1/1990 | U.S.S.R. | 359/821 |
| 2146453 | 4/1985 | United Kingdom | 359/381 |

*Primary Examiner*—Georgia Y. Epps
*Assistant Examiner*—Ricky Mack
*Attorney, Agent, or Firm*—Rogers & Scott

[57] ABSTRACT

An optical instrument comprising a housing having an optical path and a lens turret carrying at least two different optical components. At least three supporting devices are carried by the housing and engage the outer cylindrical wall of the lens turret at circumferentially spaced positions to support the turret for rotation about the longitudinal axis of the outer cylindrical wall to position a selected optical component in the optical path. Rotation of the turret is effected by a motor with a rotatable output pulley and a flexible drive element passing around the pulley and the outer cylindrical wall of the turret. One of the optical components is a rearwardly facing mirror, and the turret has a relatively large open area to enable light to pass therethrough for reflection by a mirror on the housing to the rearwardly facing mirror.

18 Claims, 5 Drawing Sheets

OPTICAL INSTRUMENT WITH ROTATABLE LENS TURRET

FIELD OF THE INVENTION

This invention relates to lens turrets which carry two or more different optical components and are rotatable to position a selected optical component in an operative position in an optical instrument, for example a telescope, camera, microscope, enlarger or gunsight.

BACKGROUND OF THE INVENTION

Such lens turrets are well known and are usually designed for a specific type of optical instrument. However, there is still a need for a lens turret which is compact, has a better stiffness to weight ratio and is more accurately positionable than known lens turrets so that the operative optical component can be positioned in a more accurate and steadier manner by means of a relatively simple adjustment mechanism.

OBJECT OF THE INVENTION

It is therefore an object of the invention to provide a lens turret with the improvements mentioned above.

STATEMENT OF THE INVENTION

The present invention provides an optical instrument comprising a housing having an optical path therein, a lens turret carrying at least two different optical components and having an outer cylindrical wall, at least three supporting devices carried by the housing and engaging the outer cylindrical wall of the lens turret at circumferentially spaced positions to support the turret for rotation about the longitudinal axis of the outer cylindrical wall to position a selected optical component in the optical path, and drive means for effecting rotation of the turret, the drive means comprising a motor with a rotatable output pulley and a flexible drive element passing around the pulley and the outer cylindrical wall of the lens turret.

The lens turret may carry at least three optical components and a stop member, with the housing carrying stop members each co-operable with the turret stop member to determine a desired rotationable position of the turret to correctly position an optical component in the optical path, at least one of the housing stop members being retractable from an operative position to an inoperative position to enable the turret stop member to pass thereby.

The motor output pulley may have a pair of longitudinally spaced circumferential grooves, with the outer cylindrical turret wall also having a pair of longitudinally spaced circumferential grooves, a first flexible drive element being located in one of the pulley grooves and in one of the turret outer wall grooves, and a second flexible drive element being located in the other of the pulley grooves and in the other of the turret outer wall grooves in the reverse rotational sense to the first flexible drive element.

The housing may carry a forwardly facing mirror and one of the optical components of the lens turret may comprise a rearwardly facing mirror, the lens turret carrying the rearwardly facing mirror within and adjacent to the outer cylindrical wall and carrying the other optical component or components within and adjacent to the outer cylindrical wall substantially diametrically opposite the rearwardly facing mirror, the lens turret having a relatively large open area within the outer cylindrical wall and adjacent the rearwardly facing mirror whereby, when the rearwardly facing mirror is in the operable path, external light can pass through the open area to the forwardly facing mirror for reflection therefrom to the rearwardly facing mirror and subsequent reflection from the rearwardly facing mirror along the optical path.

The lens turret may have a plate-like segment portion within and adjacent to the outer cylindrical wall carrying the other optical component or components, and an annular member within and adjacent to the outer cylindrical wall substantially diametrically opposite the other optical component or components, the annular member carrying the rearwardly facing mirror. A strengthening rib may extend between the segment portion and the annular member.

The invention also provides an optical instrument comprising a housing having an optical path, a lens turret carrying at least two different optical components and having an outer cylindrical wall, at least three supporting devices carried by the housing and engaging outer cylindrical wall of the lens turret at circumferentially spaced positions to support the turret for rotation about the longitudinal axis of the cylindrical outer wall to position a selected optical component in the optical path, the housing carrying a forwardly facing mirror and one of the optical components of the lens turret being a rearwardly facing mirror. The lens turret carries the rearwardly facing mirror within and adjacent to the outer cylindrical wall and carries the other optical component or components within and adjacent to the outer cylindrical walls substantially diametrically opposite the rearwardly facing mirror, the lens turret having a relatively large open area within the outer cylindrical wall and adjacent the rearwardly facing mirror whereby, when the rearwardly facing mirror is in the optical path, external light can pass through the open area to the forwardly facing mirror for reflection therefrom to the rearwardly facing mirror and subsequent reflection from the rearwardly facing mirror along the optical path.

The invention further provides a lens turret carrying at least two different optical components and having an outer cylindrical wall, one of the optical components being a rearwardly facing mirror, the lens turret carrying the rearwardly facing mirror within and adjacent to the cylindrical wall and carrying the other optical component or components within and adjacent to the outer cylindrical wall substantially diametrically opposite to the rearwardly facing mirror, the lens turret having a relatively large open area through which light can pass within the outer cylindrical wall and adjacent to the rearwardly facing mirror.

The invention further provides a lens turret for carrying at least two different optical components and having an outer cylindrical wall, one of the optical components being a rearwardly facing mirror, the lens turret having a segment portion within and adjacent to the outer cylindrical wall for carrying other optical component or components, an annular member for carrying the rearwardly facing mirror, the annular member being within and adjacent to the outer cylindrical wall substantially diametrically opposite the segment portion, whereby a relatively large open area through which light can pass is provided between the segment portion and the annular member.

The outer cylindrical wall may have a pair of laterally spaced circumferential grooves for receiving the flexible driving elements. The outer cylindrical wall may also have a further circumferential groove between the pair of circumferential grooves for receiving supporting rollers.

DESCRIPTION OF THE DRAWINGS

One embodiment of the invention will now be described, by way of example, with reference to the accompanying drawings, of which.

DESCRIPTION OF THE PREFERRED EMBODIMENT

Figure 1A:
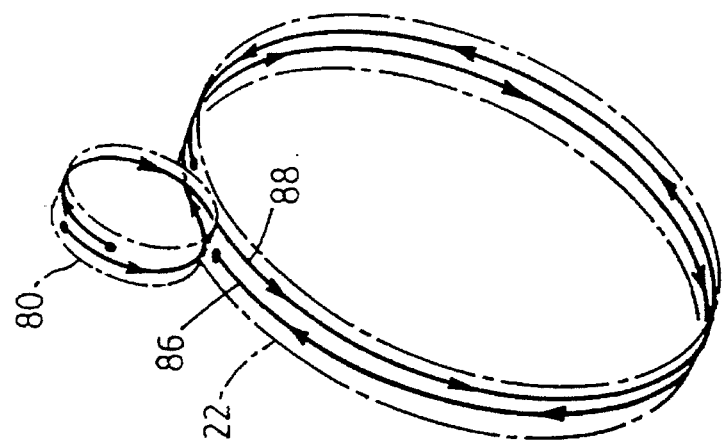
FIG. 1a is a diagrammatic view showing the cable drive for rotating the turret.

Referring to the drawings, a Cassegrain telescope comprises a main housing 12 having an optical path therein, the forward end of which is provided by a lens 14 mounted at the front end of a centrally located forwardly tapering conical lens holder 16 at the front of the housing 12. An annular concave mirror 18 surround the lens holder 14 at the front of the housing 12. A lens turret 20 is rotatably mounted on the front end of the housing 12 in a manner which will be described in more detail later.

The lens turret 20 has a outer cylindrical wall 22 with a plate-like segment portion 24 within and integral with the outer cylindrical wall 22 adjacent to the front end 26 thereof. The segment portion 24 has a pair of closely spaced apertures 28, 30, each having three tapped holes 29, 31 respectively spaced equally therearound. The segment portion 24 has an arcuate free edge 32 from which an arcuate strengthening rib 34 extends to the rear end 36 of the outer cylindrical wall 22.

A further strengthening rib 38 extends from the rib 34 to the outer cylindrical wall 22 between the two aperture 28, 30, a still further strengthening rib 40 extends from the rib 34 to the outer cylindrical wall 22 on the opposite side of the aperture 28 to the rib 38, and another strengthening rib 41 extends from the rib 34 to the outer cylindrical wall 22 on the opposite side of the aperture 30 to the rib 38.

An annular member 42 is located within and is integral with the outer cylindrical wall 22 substantially diametrically opposite the apertures 28, 30 and a further strengthening rib 44 extends between the annular member 42 and the rib 34 midway between its ends. A person skilled in the art will readily appreciate that the lens turret may be a metal casting, for example an aluminum casting. It will also be noted that the construction of the turret 20 provides substantially open areas 46, 48 on opposite sides of the rib 44.

The lens turret 20 carries a first lens assembly 50 which is secured to the front of the segment portion 24 over the aperture 28 by screws 52 which are secured in the tapped holes 29, and a second lens assembly 54 which is secured to the front of the segment portion 24 over the aperture 30 by screws 56 which are secured in the tapped holes 31. The lens turret 20 also carries a rearwardly facing mirror 58 which is secured in annular member 42 in any suitable manner which will be readily apparent to a person skilled in the art.

Turning now to the manner in which the lens turret 20 is mounted on the main housing 12, the outer surface of the outer cylindrical wall 22 of the turret 20 has three circumferential grooves 60, 62, 64 each having the same radial depth. However, the centre groove 62 is wider than the outer grooves 60, 64 which are of equal width. The housing 12 carries three supporting devices, namely rotatable rollers 66, 68, 70 which are each engaged in the centre groove 62 of the turret 20 and are equiangularly spaced therearound. Each roller 66, 68, 70 is rotatably mounted in a suitable mounting 72, 74, 76 respectively carried by the housing 12. The rollers 66, 68, 70 retain the lens turret 20 in position on the front of the housing 12 and permit rotation of the turret 20 about its longitudinal axis.

An electric motor 78 is also carried by the housing 12 and has an output drive pulley 80 with two circumferential grooves 82, 84. A first turret drive cable 86 has one end suitably secured in groove 82 of drive pulley 80, the drive cable 86 passing around groove 82 and then around groove 60 in the outer cylindrical wall 22 of lens turret 20, the other end of drive cable 86 being suitably secured in groove 60. A second turret drive cable 88 has one end suitably secured in groove 84 of drive pulley 80, the drive cable 88 passing around groove 84 in the opposite direction to cable 86 and then passing around groove 64 of outer cylindrical wall 22 of lens turret 20, again in the opposite direction to cable 86. Thus, rotation of drive pulley 80 in one direction will rotate lens turret 20 in one direction, and rotation of the drive pulley 80 in the opposite direction will rotate lens turret 20 in the opposite direction.

A gear wheel 90 is mounted on motor 78 to rotate with pulley 80, the gear wheel 90 meshing with a gear 92 of a rotary potentiometer 94 also carried by the housing 12.

Figure 5:
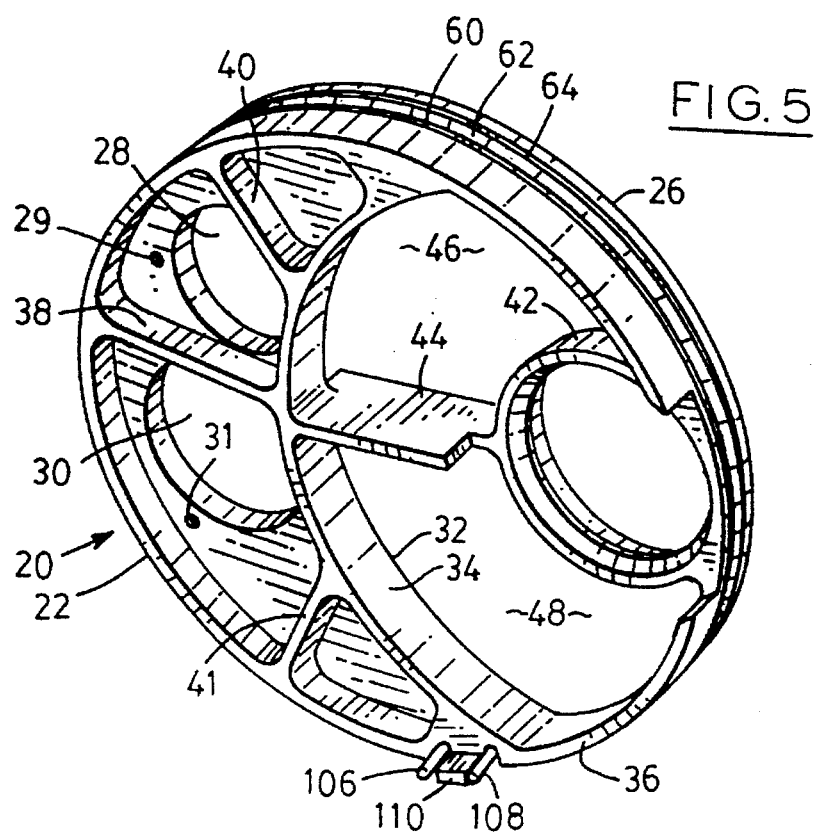
FIG. 5 is a rear perspective view of the lens turret.

The housing 12 carries stops 100, 102, 104 co-operable with respective stops 106, 108 on turret 20 (see FIGS. 3 and 5) to determine the desired rotational position of the turret 20 to correctly position the lens assembly 50, the lens assembly 54 or the rearwardly facing mirror 58 in front of the lens 14 mounted on the front end of the housing 12, i.e. to position the desired optical component in the optical path of the Cassegrain telescope. Stops 100, 104 are fixed stops and are shown in more detail in FIG. 6, and stop 104 is a retractable stop shown in more detail in FIG. 7. Stops 106, 108 are pins secured to turret 20. A magnet 110 is also secured to turret 20 between stop pins 106, 108, see FIG. 5.

Figures 6, 6A:
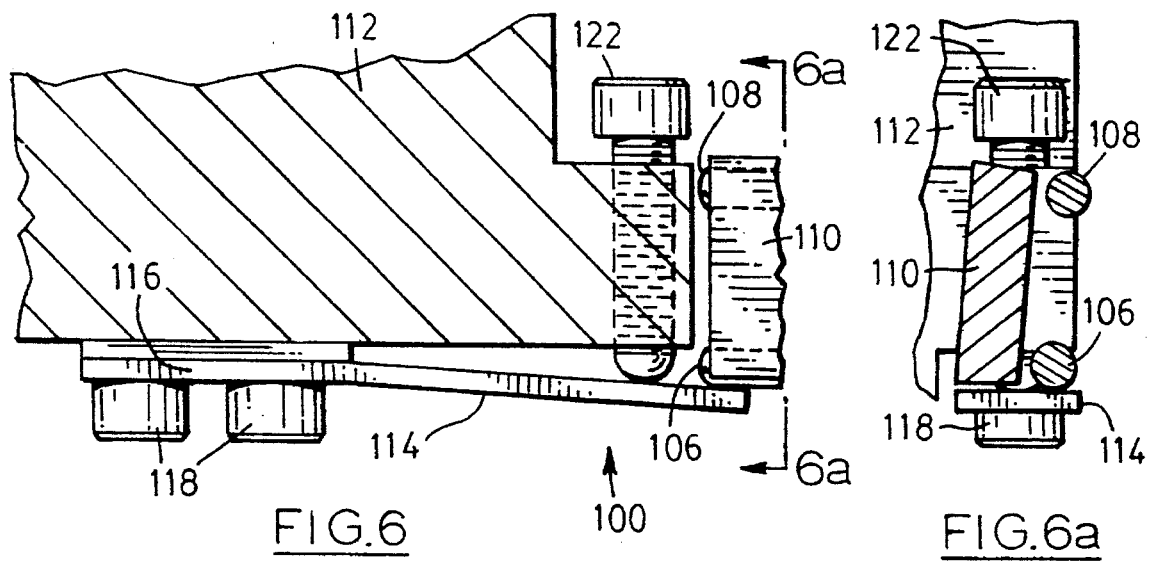
FIG. 6 is a part sectional view taken along line 6—6 of FIG. 3 of one of the fixed stops which in use are mounted on the housing, and shows also the stop pins and magnet on the lens turret.
FIG. 6a is a sectional view taken along the line 6a—6a of FIG. 6.

Referring now to FIGS. 6 and 6a, the fixed stop 100 has a carrier 112 secured in any suitable manner to the telescope housing 12. A leaf spring 114 is secured at one end 116 to the carrier 112 by bolts 118 so that its other end 120 projects beyond the end of carrier 112. An adjustment screw 122 is mounted in threaded bore 124 in the carrier 112 such that it projects therefrom into engagement with the leaf spring 114. The screw 122 can be adjusted to accurately position the free end 120 of the leaf spring 114.

The leaf spring 114 provides a hard stop for the stop pin 106 of lens turret 20, and the magnet 110 functions to retain the lens turret 20 in this position by magnetic attraction between the magnet 110 and leaf spring end 120. The fixed stop 104 is similar in construction and function and like reference numerals are used to indicate like parts.

Figure 7:
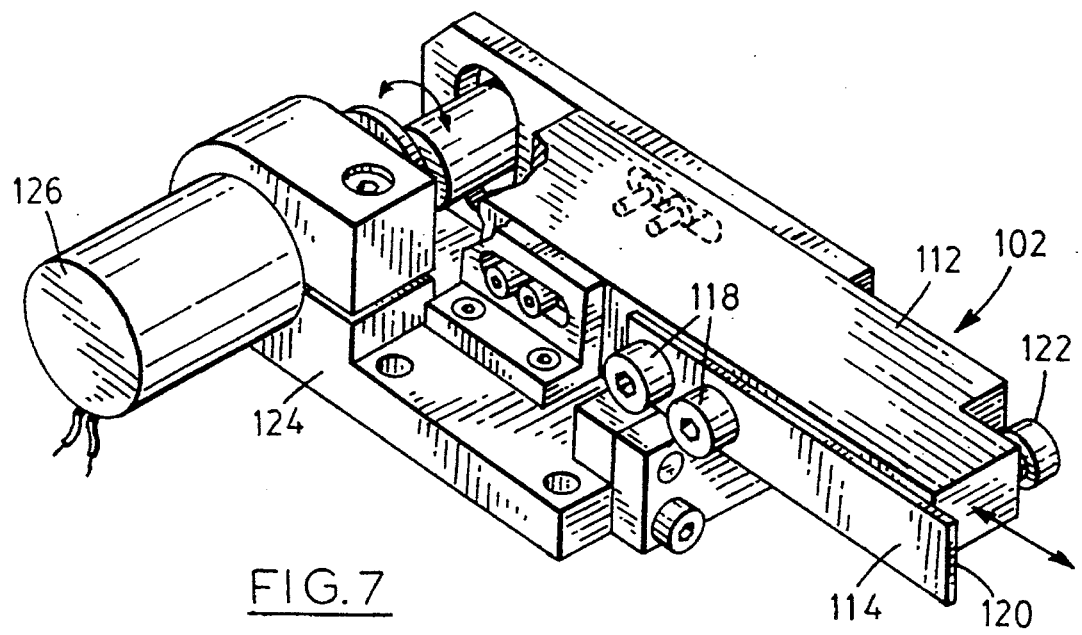
FIG. 7 is a perspective view of the retractable stop which in use is mounted on the housing.

Retractable stop 102 shown in FIG. 7 is similar in construction to fixed stops 100, 104, again with like reference numerals being used to indicate like parts, except that the carrier 112 is slidably mounted on a support 124 which is secured to the housing 12 in any suitable manner. The support 124 also carries a motor 126 which is operable to move carrier 112 between operative and inoperative positions.

Figure 1:
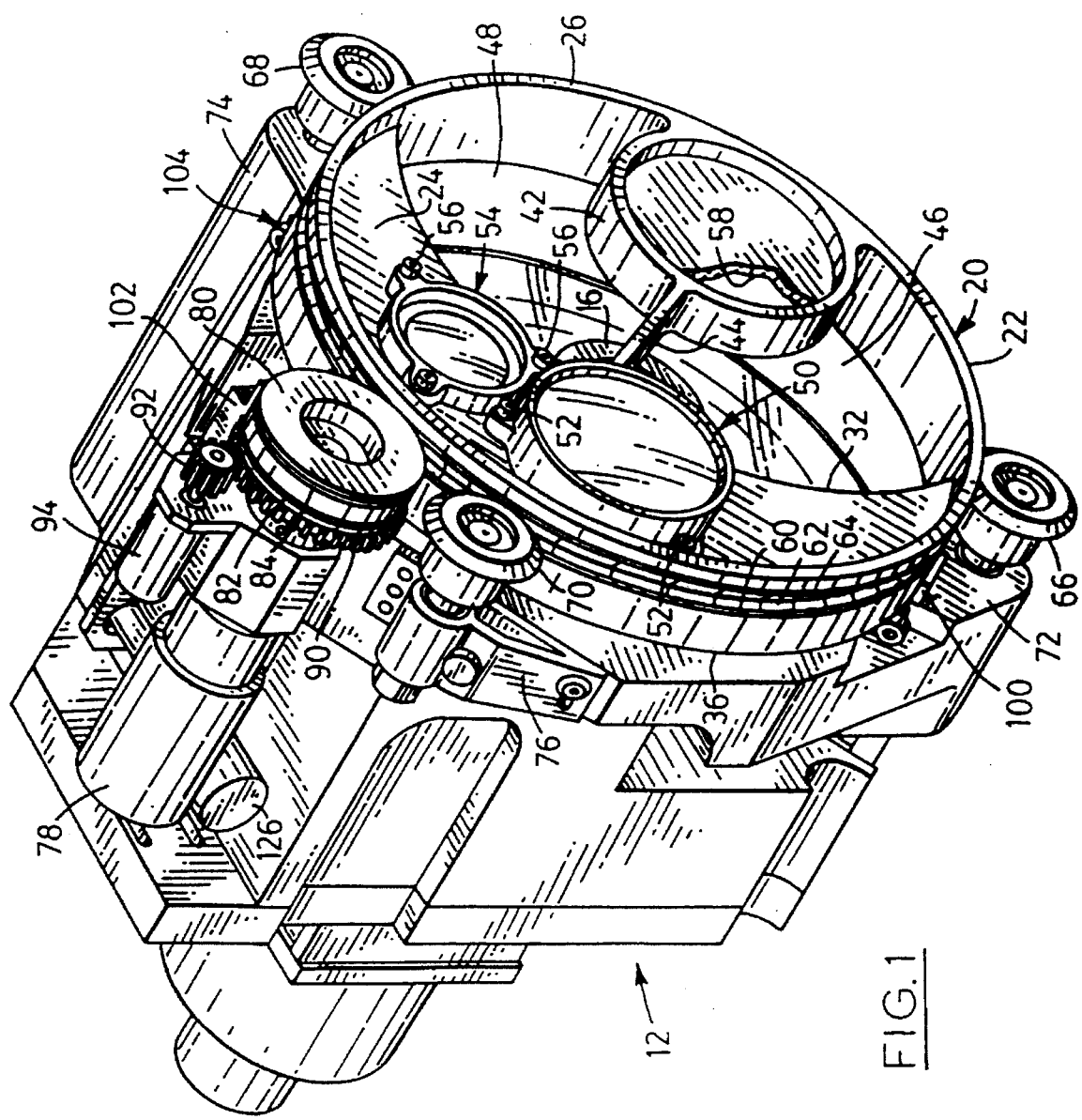
FIG. 1 is a perspective view of a Cassegrain telescope with a lens turret in accordance with one embodiment of the invention.
Figure 2:
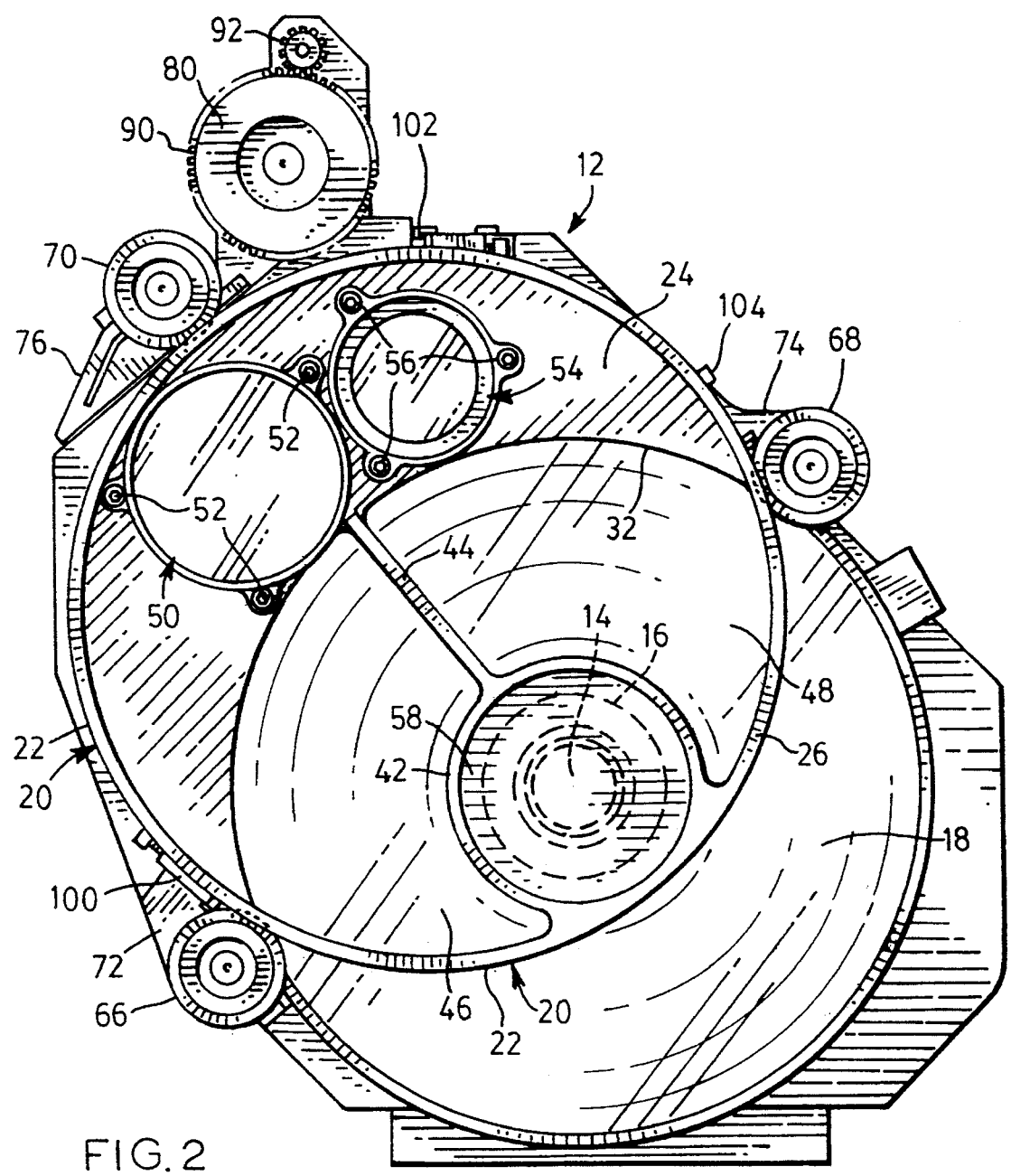
FIG. 2 is a front view of the telescope of FIG. 1.
Figure 3:
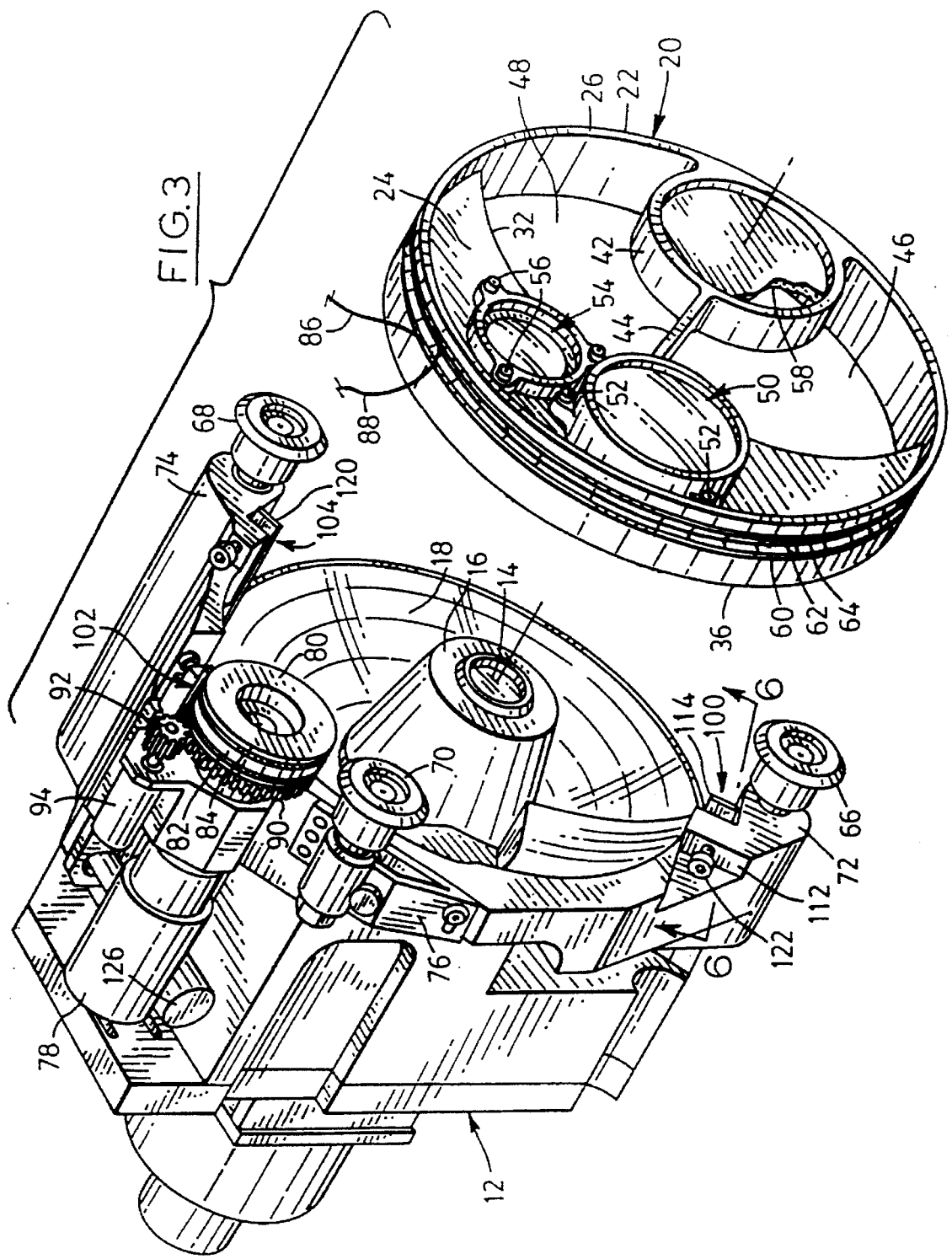
FIG. 3 is an exploded view of the telescope showing the housing and the lens turret separately.
Figure 4:
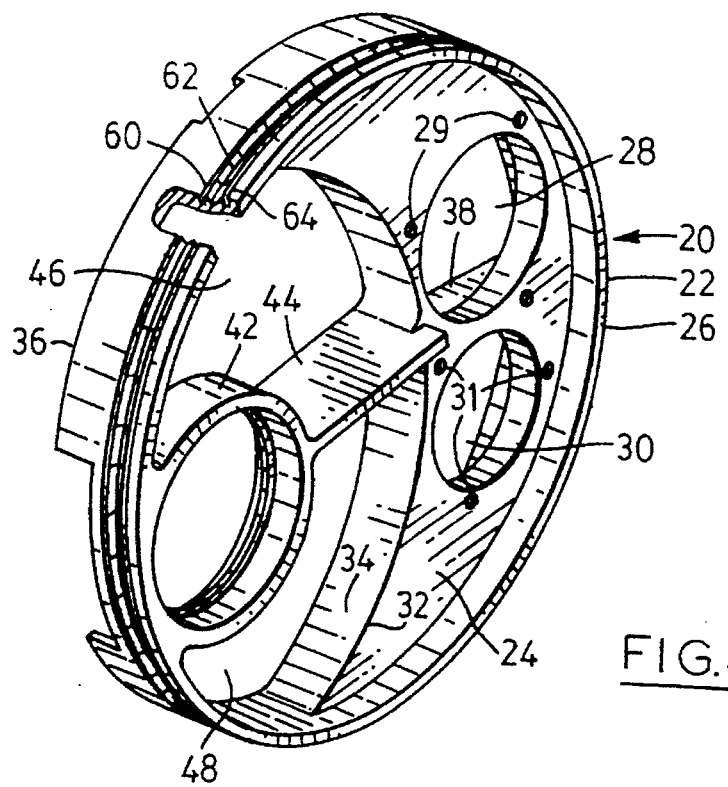
FIG. 4 is a front perspective view of the lens turret.

FIGS. 1 to 3 show the telescope with the turret 20 oriented to utilize the rearwardly facing mirror 58. In this mode, which provides a narrow field of view, external incoming light passes through the relatively large open areas 46, 48 within the outer cylindrical wall 22 of turret 20 and is reflected by the forwardly facing housing mirror 18 in a converging manner onto the rearwardly facing mirror 58. The mirror 58 then reflects the light into the lens 14, i.e. into the optical path in the housing 12 of the telescope. This mode thus demonstrates the advantages of the design of the lens turret 20 within the outer cylindrical wall 22.

In the above described mode, the turret stop pin 106 is held in engagement with the fixed stop 100 by magnet 110, thereby accurately determining the predetermined position of the lens turret 20 in this mode. To position the lens assembly 50 in the operative position in front of the housing lens 14, the stop 102 is in its retracted position and the motor 18 is operated to rotate the output pulley 80 which, through the drive cables 86, 88, rotates the lens turret 20. The direction of rotation of the output pulley 80 is such that the lens turret 20 is rotated in the clockwise direction (as seen in FIGS. 1 to 3) to position the lens assembly 50 in front of the housing lens 14. The position for this operational mode, which provides a medium field of view, is determined by engagement of the turret stop pin 108 with the fixed stop 104.

Again, the magnet 110 functions to retain the lens turret 20 in position. The potentiometer 94 (with appropriate instrumentation not shown) is provided to indicate the position of the lens turret 20, i.e. to indicate the operational mode.

If it is desired to position the lens assembly 54 in front of the housing lens 14, the stop 102 is moved to its projecting portion in the path of turret stop pin 106 and motor 78 is operated to rotate the lens turret 20 in the anti-clockwise direction, so that the turret 20 rotates until the stop pin 106 engages the retractable stop 102 with the magnet 110 again functioning to retain the lens turret 20 in position. This mode provides a wide field of view.

A similar procedure is used to reposition the lens assembly 50 or the mirror 68 in front of the housing lens 14.

The advantages of the invention will be readily apparent to a person skilled in the art from the foregoing description of a preferred embodiment. Other embodiments will also be readily apparent, the scope of the invention being defined in the appended claims.

We claim:

1. An optical instrument comprising:

a housing having an optical path therein, a lens turret carrying at least two different optical components and having an outer cylindrical wall, at least three supporting devices carried by the housing and engaging the outer cylindrical wall of the lens turret at circumferentially spaced positions to support the turret for rotation about the longitudinal axis of the outer cylindrical wall to position a selected optical component in said optical path, and drive means for effecting said rotation of the turret, said drive means comprising a motor with a rotatable output pulley and a flexible drive element passing around the pulley and the outer cylindrical wall of the lens turret.

2. An optical instrument according to claim 1 wherein the lens turret carries at least three optical components and a stop member, and said housing carries stop members each co-operable with a turret stop member to determine a desired rotational position of the turret to correctly position an optical component in said optical path, at least one of housing stop members being retractable from a operative position to an inoperative position to enable the turret stop member to pass thereby.

3. An optical instrument according to claim 1 wherein said motor output pulley has a pair of longitudinally spaced circumferential grooves and said outer cylindrical turret wall also has a pair of longitudinally spaced circumferential grooves, a first drive element being located in one of said pulley grooves and in one of turret outer wall grooves and a second flexible drive element being located in the other of said pulley grooves and in the other of said turret outer wall grooves in the reverse rotational sense to the first flexible drive element.

4. An optical instrument according to claim 1 wherein said housing carries a forwardly facing mirror and one of said optical components of the lens turret comprises a rearwardly facing mirror, said lens turret carrying said rearwardly facing mirror within and adjacent to said outer cylindrical wall and carrying the other optical component or components within and adjacent to said outer cylindrical wall substantially diametrically opposite said rearwardly facing mirror, said lens turret having an open area within the outer cylindrical wall and adjacent the rearwardly facing mirror whereby, when the rearwardly facing mirror is in said optical path, external light passes through said open area to said forwardly facing mirror for reflection therefrom to said rearwardly facing mirror and subsequent reflection from said rearwardly facing mirror along said optical path.

5. An optical instrument according to claim 4 wherein the lens turret has a plate-like segment portion within and adjacent to the outer cylindrical wall carrying the said other optical component or components, and an annular member within and adjacent to the outer cylindrical wall substantially diametrically opposite the other optical component or components, said annular member carrying the rearwardly facing mirror.

6. An optical instrument according to claim 5 wherein a strengthening rib extends between the segment portion and the annular member.

7. A lens turret carrying at least two different optical components and having an outer cylindrical wall, one of said optical components being a rearwardly facing mirror, said lens turret carrying said rearwardly facing mirror within and adjacent to said outer cylindrical wall and carrying the other optical component or components within and adjacent to said outer cylindrical wall substantially diametrically opposite said rearwardly facing mirror, said lens turret having an open area through which light passes within the outer cylindrical wall and adjacent to the rearwardly facing mirror.

8. An optical instrument comprising:

a housing having an optical path, a lens turret carrying at least two different optical components and having an outer cylindrical wall, at least three supporting devices carried by the housing and engaging the outer cylindrical wall of the lens turret at circumferentially spaced positions to support the turret for rotation about the longitudinal axis of the cylindrical outer wall to position a selected optical component in said optical path, said housing carrying a forwardly facing mirror and one of said optical components of the lens turret being a rearwardly facing mirror, said lens turret carrying said rearwardly facing mirror within and adjacent to said outer cylindrical wall and carrying the other optical component or components within and adjacent to the outer cylindrical wall substantially diametrically opposite said rearwardly facing mirror, said lens turret having an open area within said outer cylindrical wall and adjacent the rearwardly facing mirror whereby, when the rearwardly facing mirror is in said optical path, external light passes through said open area to said forwardly facing mirror for reflection therefrom to said rearwardly facing mirror and subsequent reflection from said rearwardly facing mirror along said optical path.

9. An optical instrument according to claim 8 wherein the lens turret has a plate-like segment portion within and adjacent to the outer cylindrical wall carrying the other optical component or components, and an annnular member within and adjacent to the outer cylindrical wall substantially diametrically opposite the other optical component or components, said annular member carrying the rearwardly facing mirror.

10. An optical instrument according to claim 9 wherein a strengthening rib extends between the segment portion and the annular member.

11. A lens turret according to claim 9 having a plate-like segment portion within and adjacent to the outer cylindrical wall carrying the other optical component or components, an annular member within and adjacent to the outer cylindrical wall substantially diametrically opposite the other optical component or components, said annular member carrying the rearwardly facing mirror.

12. A lens turret according to claim 11 wherein a strengthening rib extends between the segment portion and the annular member.

13. A lens turret according to claim 12 wherein the outer cylindrical wall has a pair of laterally spaced circumferential grooves for receiving the flexible driving elements.

14. A lens turret according to claim 13 wherein the outer cylindrical wall also has a further circumferential groove between said pair of circumferential grooves for receiving supporting rollers.

15. A lens turret for carrying at least two different optical components and having an outer cylindrical wall, one of said optical components being a rearwardly facing mirror, said lens turret having a segment portion within and adjacent to the outer cylindrical wall for carrying the other optical component or components, an annular member for carrying the rearwardly facing mirror, said annular member being within and adjacent to the outer cylindrical wall substantially diametrically opposite the segment portion, whereby an open area through which light passes is provided between the segment portion and the annular member.

16. A lens turret according to claim 15 whereby a strengthening rib extends between the segment portion and the annular member whereby relatively large open areas are provided between the segment portion and the annular member on opposite sides of the strengthening rib.

17. A lens turret according to claim 16 wherein the outer cylindrical wall has a pair of laterally spaced circumferential grooves for receiving flexible driving elements.

18. A lens turret according to claim 17 wherein the outer cylindrical wall also has a further circumferential groove between said pair of circumferential grooves for receiving supporting rollers.

* * * * *